United States Patent
Hattori et al.

(10) Patent No.: US 9,970,501 B2
(45) Date of Patent: May 15, 2018

(54) FRICTION MATERIAL

(71) Applicant: NISSHINBO BRAKE, INC., Tokyo (JP)

(72) Inventors: Yasuki Hattori, Gunma-Ken (JP); Mitsuaki Yaguchi, Gunma-Ken (JP); Toshiya Takeda, Gunma-Ken (JP)

(73) Assignee: NISSHINBO BRAKE, INC., Tokyo (JP)

( * ) Notice: Subject to any disclaimer, the term of this patent is extended or adjusted under 35 U.S.C. 154(b) by 0 days. days.

(21) Appl. No.: 15/472,219

(22) Filed: Mar. 28, 2017

(65) Prior Publication Data
US 2017/0248186 A1 Aug. 31, 2017

Related U.S. Application Data

(63) Continuation-in-part of application No. 14/766,691, filed on Aug. 7, 2015, now abandoned.

(51) Int. Cl.
*F16D 69/02* (2006.01)
*C10M 125/22* (2006.01)

(52) U.S. Cl.
CPC .......... *F16D 69/026* (2013.01); *C10M 125/22* (2013.01); *F16D 69/02* (2013.01); *C10M 2201/065* (2013.01); *F16D 2200/006* (2013.01); *F16D 2200/0043* (2013.01); *F16D 2200/0065* (2013.01); *F16D 2200/0073* (2013.01)

(58) Field of Classification Search
CPC . F16D 69/02; F16D 69/026; F16D 2200/0065
See application file for complete search history.

(56) References Cited

FOREIGN PATENT DOCUMENTS

| | | | |
|---|---|---|---|
| EP | 0699728 A1 | | 3/1996 |
| KR | 20090038177 A | * | 4/2009 |
| WO | WO 2011131227 A1 | * | 10/2011 ........... F16D 69/026 |

OTHER PUBLICATIONS

Gabriela Z Bosshard et al: "Optical Properteis of Polydisperse Submicrometer Aggregates of Sulfur-Containing Zinc Oxide Consisting of Spherical Nanocrystallies", 902 New J. Chem. New J. Chem, vol. 35, No. 35, Feb. 23, 2011, pp. 902-908, XP055273509, DOI: 10.1039/C0NJ00914H (Entire Document).

* cited by examiner

*Primary Examiner* — Vickey Nerangis
(74) *Attorney, Agent, or Firm* — Tracy M. Heims; Apex Juris, pllc

(57) ABSTRACT

In relation to the NAO friction material free of copper component, this invention is to provide the friction material that prevents the occurrence of metal catch while securing sufficient wear resistance. In the friction material manufactured by forming the NAO friction material composition which is free of copper component, the above-described friction material composition does not contain metal simple substance or alloy and contains, as the lubricant, metal sulfide having 600 centigrade or higher decomposition temperature to be decomposed into metal and sulfur, 2.0-5.0 weight % of graphite and a zirconium silicate as an abrasive material. Here, the metal sulfide is not a molybdenum disulfide or a tungsten disulfide. Especially, the content of the metal sulfide is preferably 0.5-2.0 weight % relative to the total amount of the friction material composition.

1 Claim, 4 Drawing Sheets

FRICTION MATERIAL

CROSS-REFERENCE TO APPLICATION AND CLAIM OF PRIORITY

This is a continuation in part application of U.S. patent application Ser. No. 14/766,691, filed Aug. 7, 2015, which is the National Stage International Application No. PCT/JP2013/067894, the disclosure of which are incorporated herein by reference.

FIELD OF THE INVENTION

This invention relates to a friction material using an automotive disc brake pad and a brake shoe.

BACKGROUND TECHNOLOGY

Conventionally, a disc brake and/or a drum brake are utilized as the automotive brake device, and a disc brake pad and a brake shoe made by fixing the friction material on a base member made of metal such as steel are utilized as a friction member of the brake device.

The friction material is classified into a semi-metallic friction material containing, as a fiber base, 30 weight % or more but less than 60 weight % of a steel fiber relative to the total amount of the friction material composition, a low steel friction material containing a steel fiber in a part of the fiber base as well as less than 30 weight % of the steel fiber relative to the total amount of the friction material composition, and Non-Asbestos-Organic (NAO) material containing no steel-based fiber such as the steel fiber and a stainless steel fiber.

The friction material generating less braking noise is demanded of late years, it is a recent trend to use the friction material member that uses the NAO friction material that does not contain the steel fiber and steel-based fiber but mainly contains a fiber base such as a nonmetallic fiber, an organic fiber, and an inorganic fiber, a binder such as a thermosetting resin, and a friction modifier such as an organic filler, an inorganic filler, an inorganic abrasive material, a lubricant, and a metallic particle.

Also, because of the environmental consciousness, the friction material which is free of copper, which is one of heavy metals, has been on demand, and the development of the NAO friction material, which contains material which is free of copper component such as a metal copper, a copper alloy, and a copper compound, has been started.

The Patent Document 1 (US Provisional Patent Publication No. 2010/0084233) discloses the friction material for an automotive brake that contains 12-24 volume % of the binder, 2-10 volume % of the fiber, 5 volume % or less of at least one type of lubricant, 15-30 volume % of at least one type of abrasive material, 10-24 volume % of at least one type of titanate and is essentially free of copper and asbestos, i.e., the NAO friction material which is free of copper component.

In the NAO friction material, the copper component, especially a copper fiber and/or a copper particle, have been added as a necessary component to satisfy the required performance, but it became more obvious that removing the copper fiber and copper particle from the NAO friction material causes various problems that did not exist before.

One of the problems is an occurrence of the metal catch. The metal catch occurs when the abrasion dust of the counter member of the friction material that is generated when the friction material frictionally slides on the counter member such as the disc rotor and brake drum made of cast iron, transfer to adhere to the metal component existing on the frictional surface of the friction material to form metal lump, and the metal lump is pushed into and affixed on the internal portion of the frictional surface of the friction material.

When the metal catch occurs, the metal lump inside the friction material significantly grinds the counter member to cause vibration when braking and the life span of the friction material is shortened because of abnormal wear of the friction material due to the grinded counter member.

Conventional friction material that contains a copper fiber and a copper particle, to prevent the metal catch, contain the metal simple substance except copper and alloy that are softer than the counter member and/or the metal sulfide having lubricity.

The Patent Document 2 (Japanese Provisional Patent Publication No. 2002-226834) discloses non-asbestos friction material characterized in manufacturing by forming and curing the non-asbestos friction material composition mainly including a fiber base, filler, and a binder as the frictional material component, and further including tin and/or tin sulfide as the friction material component.

The Patent Document 3 (Japanese Provisional Patent Publication No. 2004-35281) discloses the friction material characterize in manufacturing by forming and curing the non-asbestos friction material composition mainly including fiber base, filler, and binder as the friction material component, and further including 5.5-17.5 volume % of at least three materials that are chosen from tin, tin alloy and tin compound and have different melting points.

However, in the NAO friction material which is free of a copper fiber and a copper particle, it became obvious that the metal catch occurs more when the metal simple substance, alloy, and/or some metal sulfides that have been known to prevent the metal catch are added.

PRIOR ARTS

Patent Document

[Patent Document 1] US Provisional Patent Publication No. 2010/0084233
[Patent Document 2] Japanese Provisional Patent Publication No. 2002-226834
[Patent Document 3] Japanese Provisional Patent Publication No. 2004-35281

SUMMARY OF INVENTION

Problems to be Resolved by the Invention

An object of this invention is to provide the friction material that prevents the metal catch while securing the sufficient wear resistance in the NAO friction material which is free of copper component.

Means to Resolve

For the NAO friction material that contains a copper fiber and a copper particle as the copper component, the following structural reason is expected to lead to prevent the metal catch when adding the metal simple substance, alloy and/or metal sulfide thereto.

[Adding Metal Simple Substance and Alloy]

If a fiber and/or a particle made of the metal simple substance such as tin and/or alloy such as brass are added to the NAO friction material that contains the copper fiber and copper particle as the copper component, first the transferred film layer of metal simple substance and/or alloy are formed on the frictional surface of the counter member due to the frictional sliding between the friction material and the counter member.

The transferred film layer of the metal simple substance and/or alloy are transferred to adhere to the copper component of the friction material to hinder the occurrence of transferring to adhere the abrasion dust of the counter member to the copper component of the friction material.

The metal simple substance and/or alloy transferred and adhere to the copper component of the friction material do not become the metal lump because of the softness, which prevents the occurrence of the metal catch.

[Adding Metal Sulfide]

If the metal sulfide is added to the NAO friction material that contains the copper fiber and/or copper particle as the copper component, the lubricating effect of the metal sulfide prevents the generation of the abrasion dust and at the same time prevents the metal catch.

In the NAO friction material which is free of copper component, if the metal simple substance, alloy, and/or metal sulfide are added thereto, the following structural reason is expected to cause the occurrence of the metal catch.

[Adding Metal Simple Substance and Alloy]

If the fiber and/or particle of metal simple substance such as tin and/or alloy such as brass are added to the NAO friction material, the abrasion dust of the counter member is transferred to adhere to the metal simple substance and/or alloy existing on the frictional surface of the friction material to form the metal lump thereby occurring the metal catch.

[Adding Metal Sulfide]

If the metal sulfide is added to the NAO friction material which is free of copper fiber and copper particle as the copper component, the generation of the abrasion dust of the counter member is prevented within the relatively lower temperature range because of the lubricating effect of the metal sulfide, thereby preventing the metal catch. However, removing the copper which has high thermal conductivity from the friction material reduces the heat dissipation of the friction material and therefore exposing the friction material under high temperature and high load generates the heat reserve and tending to reach the decomposition temperature of the metal sulfide. When the metal sulfide is decomposed into the metal component and the sulfide component, the abrasion dust of the counter member is transferred to adhere to the decomposed metal component to form the metal powder, thereby causing the metal catch. However, some metal sulfides with relatively higher decomposition temperature do not cause occurrence of the metal catch.

The inventors of this invention surprisingly found out that to prevent the occurrence of the metal catch in the NAO friction material which is free of the copper fiber and copper particle as the copper component, removing the material conventionally considered to inhabit the metal catch was the most effective way of preventing the metal catch.

This invention relates to the friction material, which is manufactured by forming the NAO friction material composition which is free of the copper, metal simple substance and/or alloy and contains the predetermined particular amount of the metal sulfide as the lubricant, and is based on the following technology.

(1) The friction material manufactured by forming a NAO friction material composition which is free of copper component, wherein the friction material composition does not contain metal simple substance and/or alloy and contains, as a lubricant, metal sulfide having 600 centigrade or higher decomposition temperature to be decomposed into metal and sulfur, where the metal sulfide is not a molybdenum disulfide or a tungsten disulfide.

(2) The friction material according to (1), wherein the metal sulfide contained in the friction material composition is 0.5-2.0 weight % relative to the total amount of the friction material composition.

(3) The friction material manufactured by forming a NAO friction material composition which is free of copper component, wherein the friction material composition does not contain metal simple substance and alloy, and the friction material composition contains a metal sulfide, as a lubricant, having 600 centigrade or higher of decomposition temperature to be decomposed into metal and sulfur and having about 700 centigrade of oxidation temperature, 2.0-5.0 weight % of graphite relative to the total amount of the friction material composition, and a zirconium silicate as abrasive material.

Advantage of the Invention

This invention can provide, for the NAO friction material which is free of copper component, the friction material that can prevent the occurrence of the metal catch while securing sufficient wear resistance.

EMBODIMENT OF THE INVENTION

Figure 1:
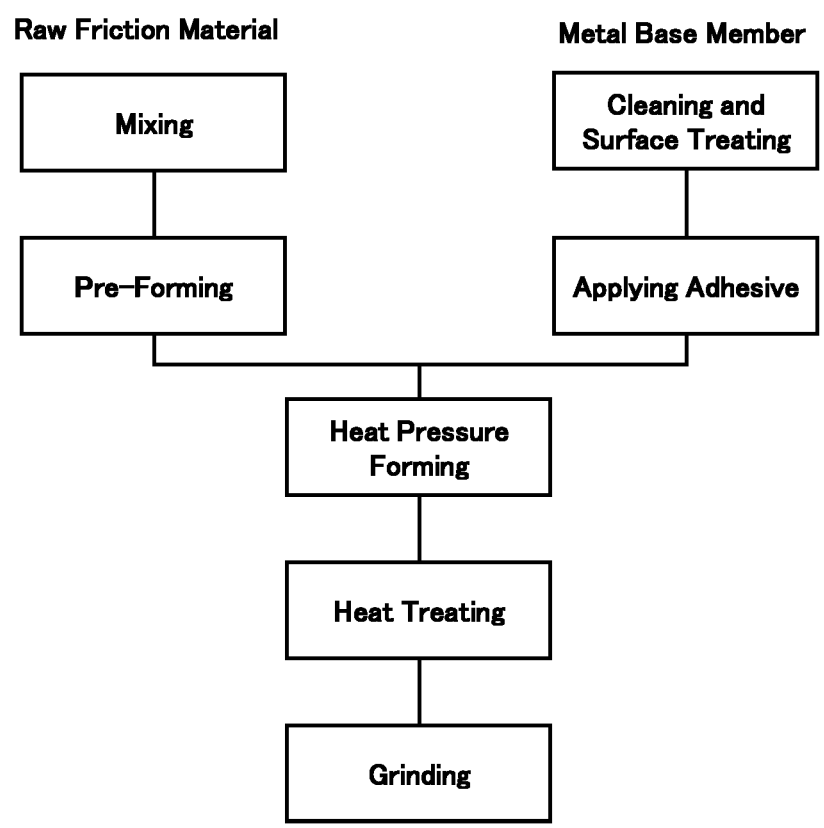
FIG. 1 is a view showing an example of the manufacturing process of the disc brake pad employing the friction material of this invention.
Figure 2:
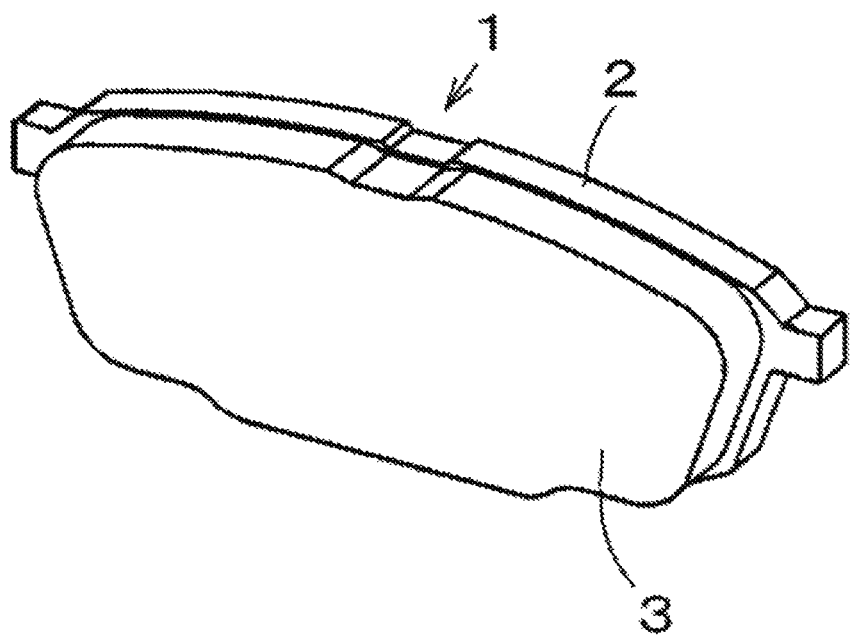
FIG. 2 is a perspective view of one example of the disc brake pad employing the friction material of this invention.
Figure 3:
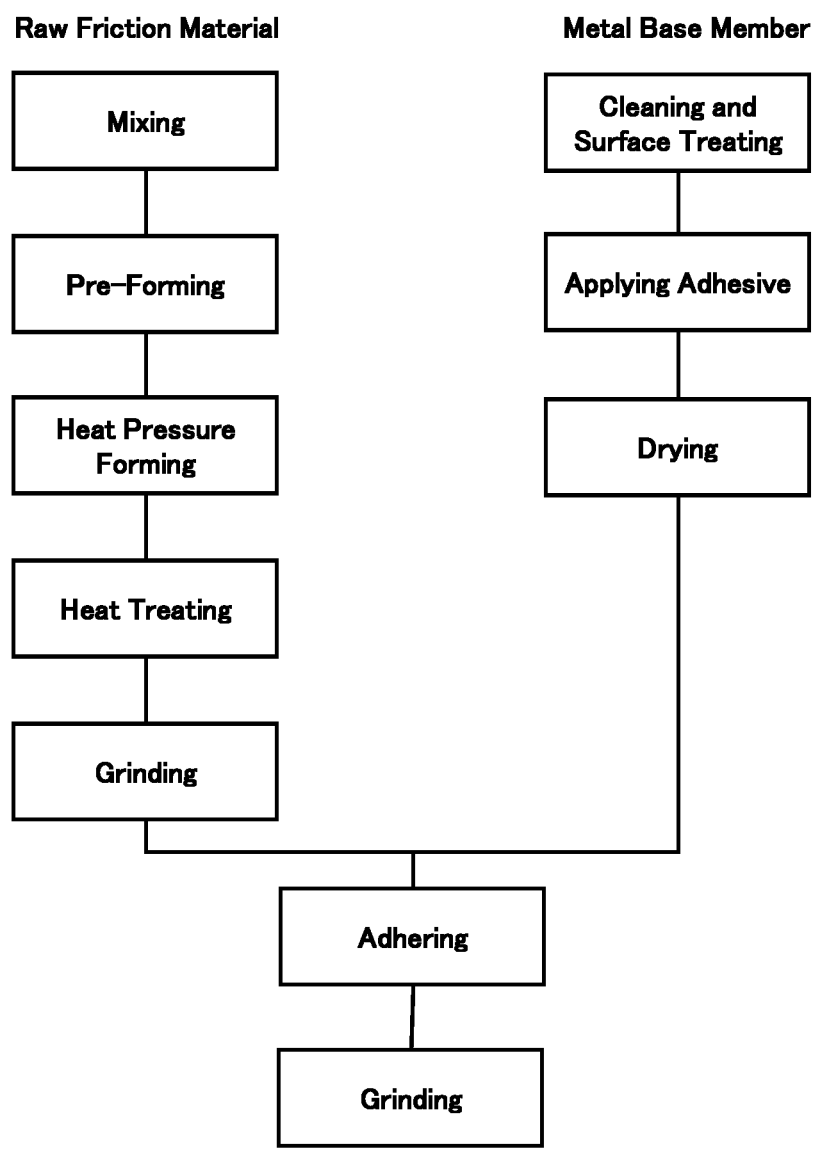
FIG. 3 is a view showing an example of the manufacturing process of the brake shoe employing the friction material of this invention.
Figure 4:
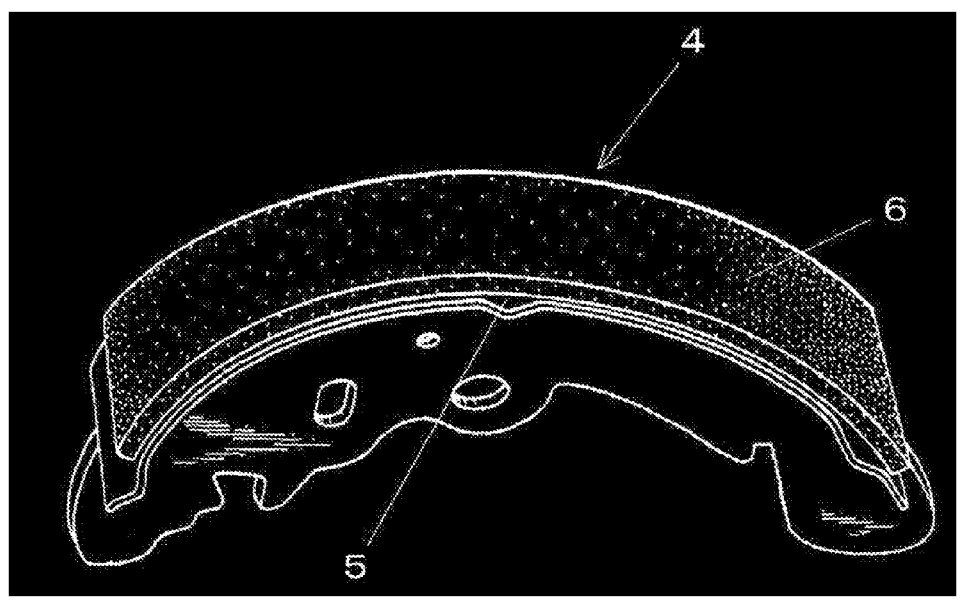
FIG. 4 is a perspective view of one example of the brake shoe employing the friction material of this invention.

According to this invention, in the friction material manufactured by forming the NAO friction material composition which is free of copper component, metal simple substance and alloy and contains the metal sulfide which has 600 centigrade or higher decomposition temperature to be decomposed into the metal and sulfur.

In the NAO friction material which is free of copper component, removing the metal simple substance and alloy from the friction material composition prevents the occurrence of the metal catch.

Also, as the lubricant, arranging the metal sulfide having 600 centigrade or higher decomposition temperature to be decomposed into the metal and sulfur prevents the occurrence of the metal catch while securing the sufficient wear resistance.

Amount of the added metal sulfide having 600 centigrade or higher decomposition temperature to be decomposed into the metal and sulfur is preferably 0.5-2.0 weight % relative to the total amount of the friction material composition. If the amount of the added metal sulfide is within the above-range, the wear resistance of the friction material becomes preferable and sufficient braking force is expected without reducing the frictional coefficient.

Examples of the metal sulfide having 600 centigrade or higher decomposition temperature to be decomposed into metal and sulfur may be zinc sulfide, molybdenum disulfide, and tungsten disulfide.

The molybdenum disulfide is oxidized at the temperature range of 300-400 centigrade to become molybdenum trioxide. At this time, the frictional coefficient increases to cause unstable braking force. Also, the tungsten disulfide is oxidized at the temperature range around 425 centigrade, which causes the similar problem of the molybdenum disulfide.

On the other hand, zinc sulfide has the oxidation temperature of about 700 centigrade and can maintain the lubricating effect up to the higher temperature range than the molybdenum disulfide, and therefore the usage of the zinc sulfide is preferable.

An example of the metal sulfide having 600 centigrade or lower decomposition temperature to be decomposed into the metal and sulfur may be tin disulfide (SnS2). Using the tin disulfide tends to cause the metal catch that could be a cause of abnormal wear of the friction material of the counter member.

Further adding 1.0-3.0 weight % of the graphite relative to the total amount of the friction material composition as the lubricant improves the wear resistance.

Also, the friction material composition according to this invention contains, other than the metal sulfide having 600 centigrade or higher decomposition temperature to be decomposed into the metal and sulfur and the graphite as the lubricant, the fiber base such as organic fiber and inorganic fiber, the binder such as the thermosetting resin, and the friction modifier such as organic filler, inorganic filler and the abrasive material.

An organic fiber such as an aramid fiber and an acrylic fiber and an inorganic fiber such as a carbon fiber, a ceramic fiber, and a rock wool can be used as the fiber base, where one or combination of these fibers can be used. The amount of the fiber base contained therein is preferably 3-10 weight % relative to the total amount of the friction material composition in order to secure the sufficient mechanical strength.

As the binder, the thermosetting resin such as phenolic resin and epoxy resin, the resin as a result of modifying above thermosetting resin with such as cashew oil, silicone oil, and various elastomer, the resin as a result of dispersing such as the various elastomer and fluoropolymer to above thermosetting resin can be used, where one or combination of these can be used.

The amount of the binder is preferably 4-15 weight % relative to the total amount of the friction material composition in order to secure the sufficient mechanical strength and the wear resistance.

As the friction modifier, an organic filler such as cashew dust, rubber dust (pulverized powder of tire tread rubber), and various unvulcanized rubber powder and vulcanized rubber powder, an inorganic filler such as barium sulfate, calcium carbonate, calcium hydroxide, vermiculite, mica, platelet or flake-like titanate, and magnetite, and the abrasive material such as silica, aluminum oxide, zirconium oxide, zirconium silicate, and magnesium oxide can be used, where one or combination of these can be used.

The amount of the friction modifier is preferably 65-90 weight % relative to the total amount of the friction material composition in consideration of the desirable frictional characteristics.

The friction material of this invention is manufactures through the process of a mixing step of uniformly mixing the above-prescribed amount of the friction material composition using the mixer, a heat pressure forming step of heat pressure forming the above-obtained raw friction material mixture set in the heat forming die to obtain the heat pressure forming article, a heat processing step of heating the obtained heat pressure forming article to complete the curing of the binder, and a grinding step of making the frictional surface.

As desired, prior to the heat pressure forming step, a granulating step of granulating the raw friction material mixture, a pre-forming step of pressure forming the raw friction material mixture set in the pre-forming die in advance or the granulated substance obtained through the granulating step in the pre-forming die in advance, and a coating step, a baking finish step following to the coating step, and scorching step may be performed after the heat pressure forming step.

When manufacturing the disc brake pad, in the earliest stage the heat pressure forming step, a back plate made of metal such as steel and the above friction material mixture, granulating substance or pre-forming article are superposed. The back plate is cleaned, surface treated, and adhesive applied in advance.

Embodiment

In the following sections, embodiments and comparative examples are shown to concretely explain this invention, but this invention is not limited to the embodiments and comparative examples described herein.

[Manufacturing Method of Friction Material According to Embodiments 1-9 and Comparative Examples 1-2]

The friction material composition with the contents shown in the TABLE 1 and TABLE 2 are mixed with the Loedige Mixer for 5 minutes and pressed in the pre-forming die at 10 MPa for 1 minute to obtain the preformed article. The obtained preformed article is superposed on the back plate cleaned, surface treated, and adhesive applied in advance, and then heat pressure forming in the heat forming die at 40 MPa at 150 centigrade for 10 minutes, heat treated (postcured) at 200 centigrade for 5 hours, and grinded to produce the brake pad for automobile (according to the Embodiments 1-9 and Comparative Examples 1-2).

The existence of metal catch, aggressiveness against the counter member, wear resistance, and frictional coefficient were evaluated for the obtained substance according to the respective embodiments and comparative examples. The evaluating method is as follows and the result of the evaluation is shown with TABLE 1 and TABLE 2.

<Existence of Metal Catch>

In the wear test, when measuring the frictional wear amount at the respective temperature, the metal catch was visually observed and is evaluated based on the following standard.

o: no metal catch x: metal catch

<Aggressiveness against the Counter Member>

According to the "Wear Test Procedure on Inertia Dynamometer" of the JASO C427, under the condition of the initial speed of braking at 50 km/h, braking deceleration at 0.3G, appropriate braking frequency, brake temperature before braking operation at 100 centigrade, 200 centigrade, 300 centigrade, and 400 centigrade, the abrasion amount ($\mu$m) of the disc rotor was measured and the braking frequency at 1000 cycle was measured to evaluate based on the following standard.

⊚: Abrasion amount of the disc rotor ($\mu$m)<15 o: 15≤abrasion amount of the disc rotor ($\mu$m)<20

Δ: 20≤abrasion amount of the disc rotor (μm)<25
x: 25≤abrasion amount of the disc rotor (μm)
  <Wear Resistance>
  According to the "Wear Test Procedure on Inertia Dynamometer" of the JASO C427, under the condition of the initial speed of braking at 50 km/h, braking deceleration at 0.3G, appropriate braking frequency, brake temperature before braking operation at 100 centigrade, 200 centigrade, 300 centigrade, and 400 centigrade, the wear amount (mm) of the friction material was measured and the braking frequency at 1000 cycle was measured to evaluate based on the following standard.
  ⊚: Wear amount of the disc pad (mm)<0.15
  ○: 0.15≤Wear amount of the disc pad (mm)<0.20
  Δ: 0.20≤Wear amount of the disc pad (mm)<0.25
  x: Wear amount of the disc pad (mm)≥0.25
  <Average Frictional Coefficient>
  According to the "Second Effect Test" of the JASO C406, performing 5 times of the braking test under 4 MPa of hydraulic pressure at the initial speed of braking at 50 km/h to determine the average value.
  ⊚: 0.42 or more but less than 0.45
  ○: 0.39 or more but less than 042
  Δ: 0.36 or more but less than 0.39
  x: less than 0.36

TABLE 1

| | | EB1 | EB2 | EB3 | EB4 | EB5 |
|---|---|---|---|---|---|---|
| Fiber | Aramid Fiber | 2 | 2 | 2 | 2 | 2 |
| Base | Biosoluble Rock Wool | 3 | 3 | 3 | 3 | 3 |
| Binder | Phenolic Resin | 6 | 6 | 6 | 6 | 6 |
| Lubricant | Zinc Sulfide (ZnS) | 0.2 | 0.5 | 1 | 2 | 3 |
| | Tin Disulfide ($SnS_2$) | 0 | 0 | 0 | 0 | 0 |
| | Tin Particle | 0 | 0 | 0 | 0 | 0 |
| | Graphite | 4 | 4 | 4 | 4 | 4 |
| Abrasive Material | Zirconium Silicate | 2 | 2 | 2 | 2 | 2 |
| | Zirconium Oxide | 22 | 22 | 22 | 22 | 22 |
| Organic Filler | Cashew Dust | 5 | 5 | 5 | 5 | 5 |
| | Pulverized Powder of Tire Tread Rubber | 2 | 2 | 2 | 2 | 2 |
| Inorganic Filler | Mica | 3 | 3 | 3 | 3 | 3 |
| | Vermiculite | 2 | 2 | 2 | 2 | 2 |
| | Magnetite | 3 | 3 | 3 | 3 | 3 |
| | Platelet Potassium Hexatitanate | 20 | 20 | 20 | 20 | 20 |
| | Calcium Hydroxide | 2 | 2 | 2 | 2 | 2 |
| | Barium Sulfate | 23.8 | 23.5 | 23 | 22 | 21 |
| | Total | 100 | 100 | 100 | 100 | 100 |
| Evaluation | Metal Catch | ○ | ○ | ○ | ○ | ○ |
| | Aggressiveness against Counter Member | ⊚ | ⊚ | ⊚ | ⊚ | ⊚ |
| | Wear Resistance | Δ | ○ | ⊚ | ⊚ | ⊚ |
| | Frictional Coefficient | ⊚ | ⊚ | ⊚ | ○ | Δ |

EB = Embodiment
CE = Comparative Example

TABLE 2

| | | EB6 | EB7 | EB8 | EB9 | CE1 | CE2 |
|---|---|---|---|---|---|---|---|
| Fiber | Aramid Fiber | 2 | 2 | 2 | 2 | 2 | 2 |
| Base | Biosoluble Rock Wool | 3 | 3 | 3 | 3 | 3 | 3 |
| Binder | Phenolic Resin | 6 | 6 | 6 | 6 | 6 | 6 |
| Lubricant | Zinc Sulfide (ZnS) | 1 | 1 | 1 | 1 | 0 | 0 |
| | Tin Disulfide ($SnS_2$) | 0 | 0 | 0 | 0 | 1 | 0 |
| | Tin Particle | 0 | 0 | 0 | 0 | 0 | 1 |
| | Graphite | 1 | 2 | 5 | 6 | 4 | 4 |
| Abrasive Material | Zirconium Silicate | 2 | 2 | 2 | 2 | 2 | 2 |
| | Zirconium Oxide | 22 | 22 | 22 | 22 | 22 | 22 |
| Organic Filler | Cashew Dust | 5 | 5 | 5 | 5 | 5 | 5 |
| | Pulverized Powder of Tire Tread Rubber | 2 | 2 | 2 | 2 | 2 | 2 |
| Inorganic Filler | Mica | 3 | 3 | 3 | 3 | 3 | 3 |
| | Vermiculite | 2 | 2 | 2 | 2 | 2 | 2 |
| | Magnetite | 3 | 3 | 3 | 3 | 3 | 3 |
| | Platelet Potassium Hexatitanate | 20 | 20 | 20 | 20 | 20 | 20 |
| | Calcium Hydroxide | 2 | 2 | 2 | 2 | 2 | 2 |
| | Barium Sulfate | 26 | 25 | 22 | 21 | 23 | 23 |
| | Total | 100 | 100 | 100 | 100 | 100 | 100 |
| Evaluation | Metal Catch | ○ | ○ | ○ | ○ | X | X |
| | Aggressiveness against Counter Member | ○ | ○ | ⊚ | ⊚ | Δ | X |
| | Wear Resistance | Δ | ○ | ⊚ | ⊚ | Δ | X |
| | Frictional Coefficient | ⊚ | ⊚ | ○ | Δ | ⊚ | ⊚ |

According to TABLE 1 and TABLE 2, in the NAO friction material which is free of copper component, it was found that containing the metal sulfide having 600 centigrade or higher decomposition temperature to decompose into the metal and sulfur as the lubricant prevents the occurrence of the metal catch and at the same time the characteristics required as the friction material such as aggressiveness against the counter member, wear resistance, and frictional coefficient can be sufficiently secured.

INDUSTRIAL APPLICABILITY

According to this invention, recently demanded friction material which has less brake noise generation and is free of copper as the heavy metal can be obtained while securing sufficient wear resistance and preventing the occurrence of the metal catch, which provides an excellent practical value.

EXPLANATION OF THE REFERENCE NO

1. Disc Brake Pad
2. Back Plate
3. Friction Material
4. Brake Shoe
5. Brake Shoe Body
6. Friction Material (Lining)

What we claim is:
1. A friction material manufactured by forming a NAO friction material composition which is free of copper component, wherein
said friction material composition does not contain metal simple substance and alloy, and said friction material composition contains
0.5-2.0 weight % of a zinc sulfide relative to the total amount of the friction material composition, as a lubricant,
2.0-5.0 weight % of graphite relative to the total amount of the friction material composition, as a lubricant, and
a zirconium silicate as an abrasive material,
where a total amount of said zinc sulfide and graphite is 3.0-6.0 weight % relative to the total amount of friction material composition.

* * * * *